United States Patent
Santos et al.

(10) Patent No.: US 12,313,430 B2
(45) Date of Patent: May 27, 2025

(54) POSITION SENSOR SYSTEM USING EQUIDISTANTLY SPACED MAGNETIC SENSOR ARRAYS

(71) Applicant: The Timken Company, North Canton, OH (US)

(72) Inventors: Alfred John Santos, Keene, NH (US); Lei Wang, Solon, OH (US); Mark E. LaCroix, Winchester, NH (US)

(73) Assignee: The Timken Company, North Canton, OH (US)

( * ) Notice: Subject to any disclaimer, the term of this patent is extended or adjusted under 35 U.S.C. 154(b) by 52 days.

(21) Appl. No.: 17/777,789

(22) PCT Filed: Oct. 6, 2020

(86) PCT No.: PCT/US2020/054362
§ 371 (c)(1),
(2) Date: May 18, 2022

(87) PCT Pub. No.: WO2021/158265
PCT Pub. Date: Aug. 12, 2021

(65) Prior Publication Data
US 2022/0412774 A1 Dec. 29, 2022

Related U.S. Application Data

(60) Provisional application No. 62/970,441, filed on Feb. 5, 2020.

(51) Int. Cl.
*G01D 5/14* (2006.01)
*G01P 3/481* (2006.01)

(52) U.S. Cl.
CPC ............. *G01D 5/145* (2013.01); *G01P 3/481* (2013.01)

(58) Field of Classification Search
CPC ................................ G01D 5/145; G01P 3/481
See application file for complete search history.

(56) References Cited

U.S. PATENT DOCUMENTS

| | | |
|---|---|---|
| 6,400,143 B1 | 6/2002 | Travostino et al. |
| 6,720,763 B1 | 4/2004 | Nehl et al. |
| (Continued) | | |

FOREIGN PATENT DOCUMENTS

DE 4021105 A1 2/1991

OTHER PUBLICATIONS

International Search Report and Written Opinion of PCT/US2020/054362, dated Dec. 1, 2021 (15 pages).

(Continued)

*Primary Examiner* — Stephanie E Bloss
*Assistant Examiner* — Michael A Harrison
(74) *Attorney, Agent, or Firm* — Michael Best & Friedrich LLP

(57) ABSTRACT

A system and method for determining a position and or speed of a rotating shaft includes a target wheel for securement to a rotatable shaft, the target wheel including a plurality of North/South pole pairs, each pole of each North/South pole pairs being essentially the same size; and a sensor assembly. The sensor assembly includes a first magnetic sensor array for sensing the pole pairs to provide a cosine signal and a sine signal and a second magnetic sensor array for sensing the pole pairs to provide a cosine signal and a sine signal, wherein the second magnetic sensor array is disposed transverse to the first magnetic sensor array. An electronic processor is configured to receive inputs from the first magnetic sensor array and the second magnetic sensor array, and to determine a position and/or speed of the shaft.

20 Claims, 6 Drawing Sheets

(56) References Cited

U.S. PATENT DOCUMENTS

| | | |
|---|---|---|
| 7,339,370 B2 | 3/2008 | Reimer et al. |
| 10,103,657 B2 | 10/2018 | Kuwahara et al. |
| 2002/0190709 A1* | 12/2002 | Frederick ............... G01D 5/145 |
| | | 324/207.2 |
| 2011/0016960 A1 | 1/2011 | Debrailly |
| 2012/0116717 A1 | 5/2012 | Satou et al. |
| 2012/0229127 A1 | 9/2012 | Koto et al. |
| 2015/0054499 A1* | 2/2015 | Musha ................... G01D 5/147 |
| | | 324/207.25 |
| 2015/0219472 A1 | 8/2015 | Ausserlechner |
| 2018/0231399 A1* | 8/2018 | Okumura ................ G01B 7/30 |
| 2019/0074780 A1* | 3/2019 | Furukawa ................ G01D 5/12 |
| 2019/0242764 A1 | 8/2019 | Nicholl et al. |

OTHER PUBLICATIONS

European Patent Office Action for Application No. 20797002.1 dated Jun. 17, 2024 (5 pages).

* cited by examiner

POSITION SENSOR SYSTEM USING EQUIDISTANTLY SPACED MAGNETIC SENSOR ARRAYS

RELATED APPLICATIONS

The present patent application claims the benefit of prior filed U.S. provisional patent application 62/970,441, filed on Feb. 5, 2020, the entire contents of which are hereby incorporated by reference.

BACKGROUND

The present invention relates to position and/or speed sensing systems and methods.

Various absolute position sensors and associated signal processing techniques are known for determining an absolute position of a rotating or linearly-moving target. For example, U.S. Pat. No. 8,058,868 discloses one such example of an off axis magnetic sensor that uses a two-track, multi-pole magnetic target with evenly-spaced and sized high resolution magnetic poles. The '868 patent describes how to use a high resolution Hall effect sensor like the Timken MPS160 or MPS512 sensor chip to detect local absolute position over a magnetic pole pair. The '868 patent also shows how to use a second track with one or more pole pairs to generate a coarse or low resolution absolute position signal that can then be used together with a high resolution Hall effect sensor like the Timken MPS160 or MPS512 sensor chip to determine a fine or high resolution absolute position over a longer arc or longer linear range.

SUMMARY

The present invention contemplates improvements to the sensor arrangements and signal processing described above.

The disclosure introduces techniques to effectively increase the accuracy of the output signal. The errors reduced include: (a) once per revolution error due to an off-center condition of a target wheel, (b) inter cycle error due to small variations in the circumferential length of each magnet pole, (c) inter cycle error due to small variations in the sinusoidal shape of each magnet pole, and (d) inter cycle error due to small variations in the distortions and noise differences in the Sine and Cosine signal paths within the sensor array integrated circuit for a magnetic sensor array.

In one embodiment, a system for determining a position and/or speed of a rotatable shaft of a device includes a target wheel for securement to a rotatable shaft, the target wheel including a plurality of North/South pole pairs, each pole of each North/South pole pairs being essentially the same size; and a sensor assembly. The sensor assembly includes a first magnetic sensor array for sensing the pole pairs to provide a cosine signal and a sine signal; a second magnetic sensor array for sensing the pole pairs to provide a cosine signal and a sine signal, wherein the second magnetic sensor array is disposed transverse to the first magnetic sensor array; and an electronic processor configured to receive inputs from the first magnetic sensor array and the second magnetic sensor array, and to determine a position and/or speed of the shaft.

Another embodiment is directed to a method for determining a position and/or speed of a rotatable shaft of a device. The method includes sensing a target wheel secured to a rotatable shaft that includes a plurality of North/South pole pairs with a first magnetic sensor array to provide a cosine signal and a sine signal and sensing the target wheel with a second magnetic sensor array for sensing the pole pairs to provide a cosine signal and a sine signal, wherein the second magnetic sensor array is disposed transverse to the first magnetic sensor array. The method further includes summing the cosine signals and the sine signals from the first magnetic sensor array with the cosine signals and sine signals from the second magnetic sensor array, and determining a position and/or speed of the shaft with an electronic processor from the summed cosine signals and the summed sine signals.

In another embodiment, the second magnetic sensor array is 180 degrees mechanical from the first magnetic sensor array.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

As should also be apparent to one of ordinary skill in the art, the systems shown in the figures are models of what actual systems might be like. As noted, many of the modules and logical structures described are capable of being implemented in software executed by a microprocessor or a similar device or of being implemented in hardware using a variety of components including, for example, application specific integrated circuits ("ASICs"). Terms like "processing unit" and "electronic processor" may include or refer to both hardware and/or software. Thus, the claims should not be limited to the specific examples or terminology or to any specific hardware or software implementation or combination of software or hardware.

Figure 1:
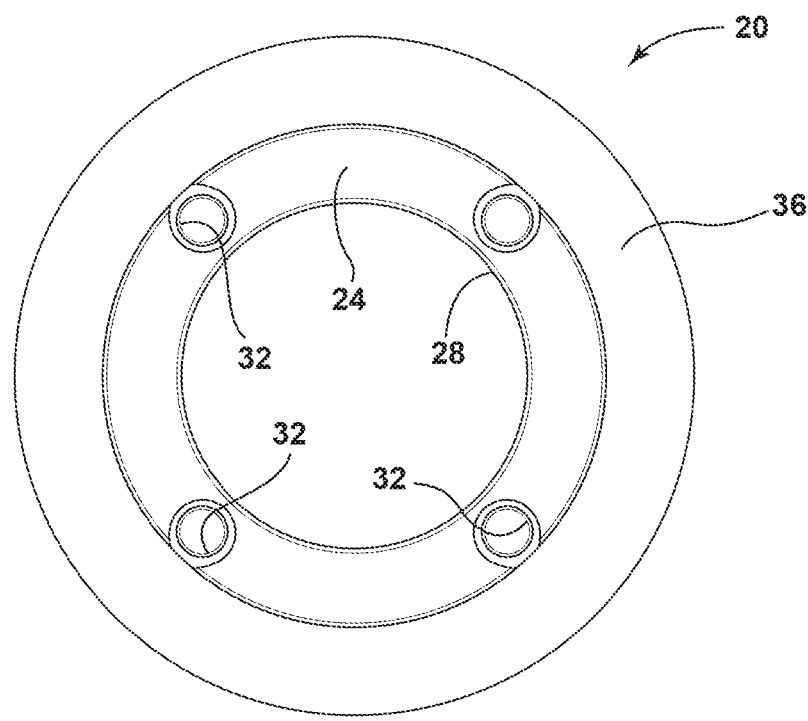
FIG. 1 illustrates a top view of one embodiment of a target wheel.
Figure 2:
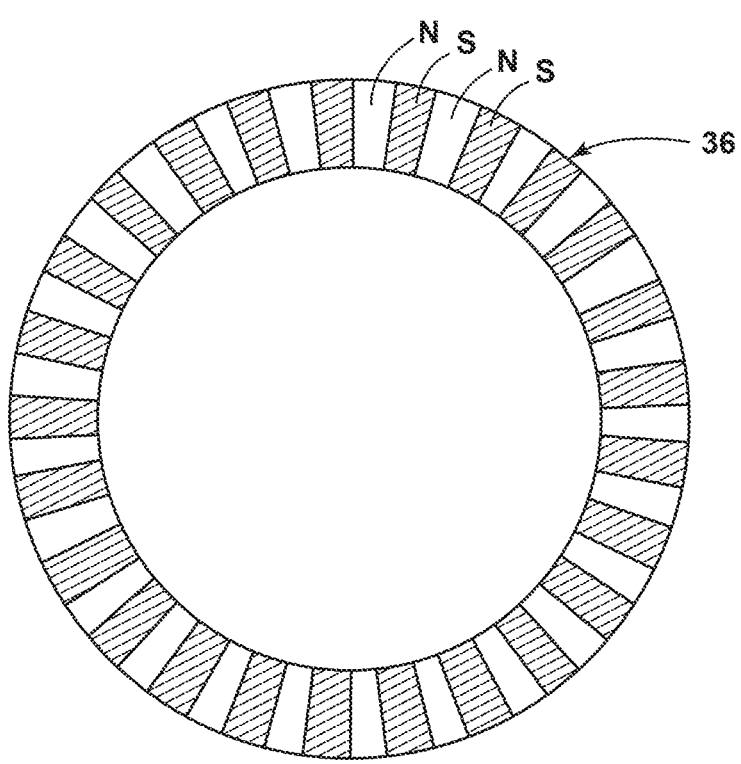
FIG. 2 shows one embodiment for a pattern of magnets extending about the target wheel of FIG. 1.

FIG. 1 illustrates one embodiment of a circular shaped multi-pole magnet target wheel 20 that includes a hub 24 with an opening 28 for receiving a rotatable shaft. The hub 24 includes spaced apertures 32 for mounting to a shaft for rotation therewith. The target wheel 20 includes an outer multi-polar magnetic ring 36 extending about the entirety thereof. With reference to FIG. 2, the multi-polar magnetic ring 36 represents a single track of North/South pole pairs, and preferably a single high resolution track of magnets that includes twenty-five magnetic pole pairs or North/South pole pairs. Each pole of each North/South pole pair is the same size (e.g., arc length). The high resolution track of the target wheel 20 can have more or fewer magnetic pole pairs in other embodiments. Other embodiments with multiple tracks are also contemplated, including a second reference track for determining an absolute position of the target wheel 20 and the shaft.

Figure 3:
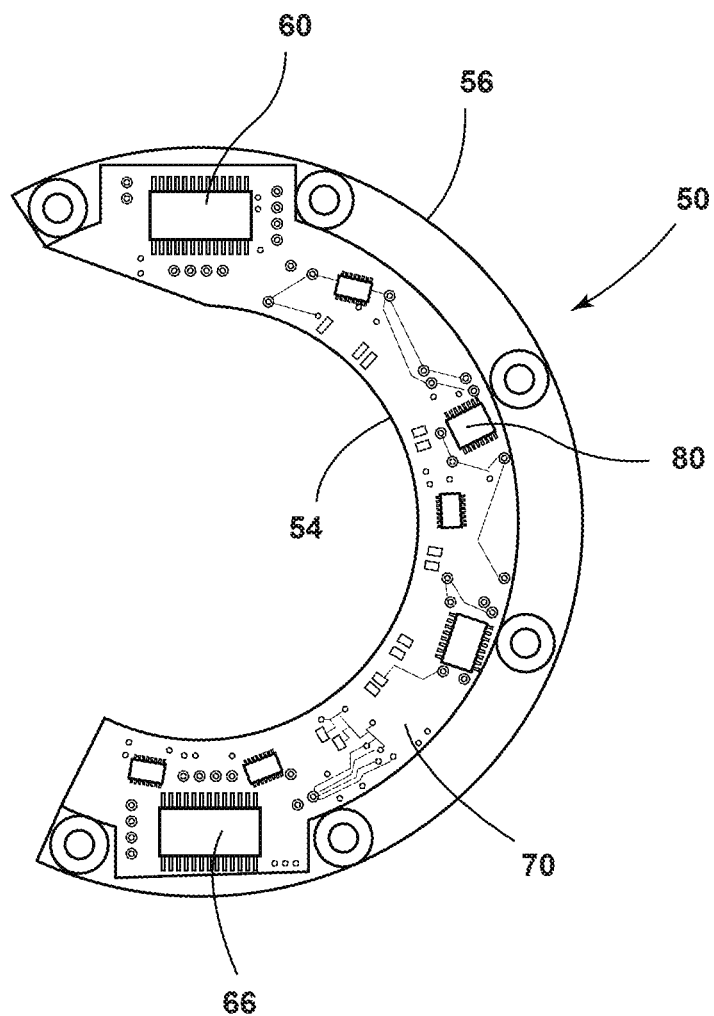
FIG. 3 shows a top view of a sensor assembly.

FIG. 3 illustrates a top view of a magnetic position sensor assembly 50 that includes an inner edge 54 for fixed alignment near a rotatable shaft and the target wheel 20. The magnetic position sensor assembly 50 includes an outer edge 56 and has a generally horse-shoe shaped or "C" shaped, annular body.

The magnetic position sensor assembly 50 shown in FIG. 3 includes a first magnetic sensor array 60 and a second magnetic sensor array 66. Both of the magnetic sensor arrays 60, 66 sense the pole pairs of the target wheel 20 to provide a cosine signal and a sine signal. The second magnetic sensor array 66 is disposed transverse to the first magnetic sensor array 60 or at an angle of 180 mechanical degrees with respect to the first magnetic sensor array 60, and is aligned across a central axis of a rotatable shaft (not shown), which is disposed within the opening side of the sensor assembly 50 near the inner edge 54 thereof. Thus, the magnetic sensor arrays 60, 66 are intended to be disposed equidistant, about and from a central axis of a rotatable shaft, and a line drawn between the magnetic sensor arrays 60, 66 is intended to intersect a central axis of a rotatable shaft. The magnetic sensor arrays 60, 66 each may include a string of sensing elements such as Hall effect sensors. In one embodiment, the first magnetic sensor array 60 is a first Hall Effect sensor array and the second magnetic sensor array 66 is a second Hall Effect sensor array that each include 16 sensing elements.

The sensor assembly 50 shown in FIG. 3 includes a printed circuit board 70 having various circuits and an electronic processor 80 that receives position signals from the magnetic sensor arrays 60, 66. In one embodiment, the electronic processor 80 takes the form of an application specific integrated circuit (ASIC).

Figure 4:
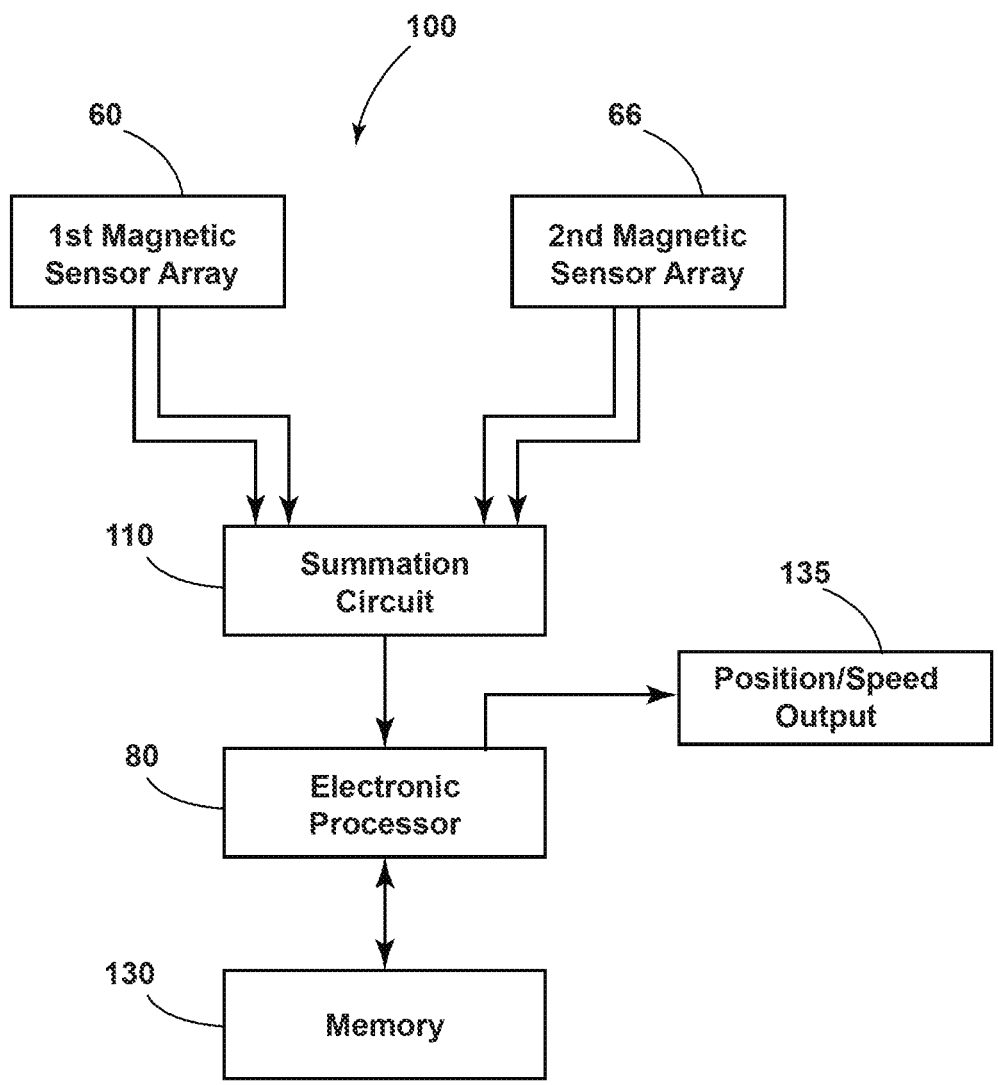
FIG. 4 shows a block diagram for one embodiment of a position sensing system including the sensor assembly.

FIG. 4 shows a block diagram of one embodiment of a position and speed determining system 100 that includes the first magnetic sensor array 60 and the second magnetic sensor array 66. The position/speed determining system 100 includes a summation circuit 110 provided on the printed circuit board to receive sine signals and cosine signals from the magnetic sensor arrays 60, 66. The summation circuit 110 provides summed inputs or summed signals to an electronic processor 80 provided on the printed circuit board 70. The electronic processor 80 is in communication with a memory 130 provided on the printed circuit board 70. The electronic processor 80 provides a position or speed output 135 for another device in one embodiment.

Figure 5:
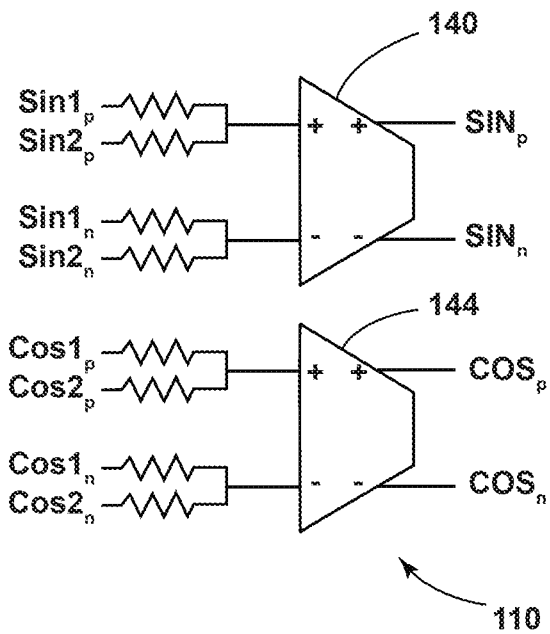
FIG. 5 illustrates one embodiment of a schematic diagram of a summation circuit.

FIG. 5 illustrates one embodiment of a schematic diagram of the summation circuit 110 that includes a pair of amplifiers 140, 144. The summation circuit 110 is configured to sum the Sine signals and the Cosine signals for each of the magnetic sensor arrays 60, 66. In one embodiment, the summation circuit 110 includes an analog to digital converter (ADC) and provides summed cosine and sine signals as digital signals to the electronic processor 80.

In one embodiment, a separate analog to digital converter is provided for converting analog Cosine and Sine signals to digital signals. In another embodiment, a separate ADC (not shown) is provided with the electronic processor 80 to convert the analog Cosine and Sine signals to digital signals.

In one embodiment, the memory 130 includes a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The electronic processor 80 is connected to the memory 130 and executes software instructions that are capable of being stored in a RAM of the memory 130 (e.g., during execution), a ROM of the memory 130 (e.g., on a generally permanent basis), or another non-transitory computer readable medium. Software included for the processes and methods for the position sensing system can be stored in the memory 130. The software can include firmware, one or more applications, program data, filters, rules, one or more program modules, and other executable instructions. The electronic processor 80 includes internal memory in some embodiments.

The position and speed determining system 100 includes a position and or speed output 135 provided from the electronic processor 80 that provides a position or speed of the rotatable shaft to another device, such as a control device, for control and/or display purposes.

Operation

In operation, the target wheel 20 is secured to a rotatable with a shaft. The sensor assembly 50 is disposed adjacent to the target wheel 20, so that the first magnetic sensor array 60 and the second magnetic sensor array 66 are aligned with the multi-polar magnetic ring 36 to sense the magnets and the movement thereof.

Figure 6:
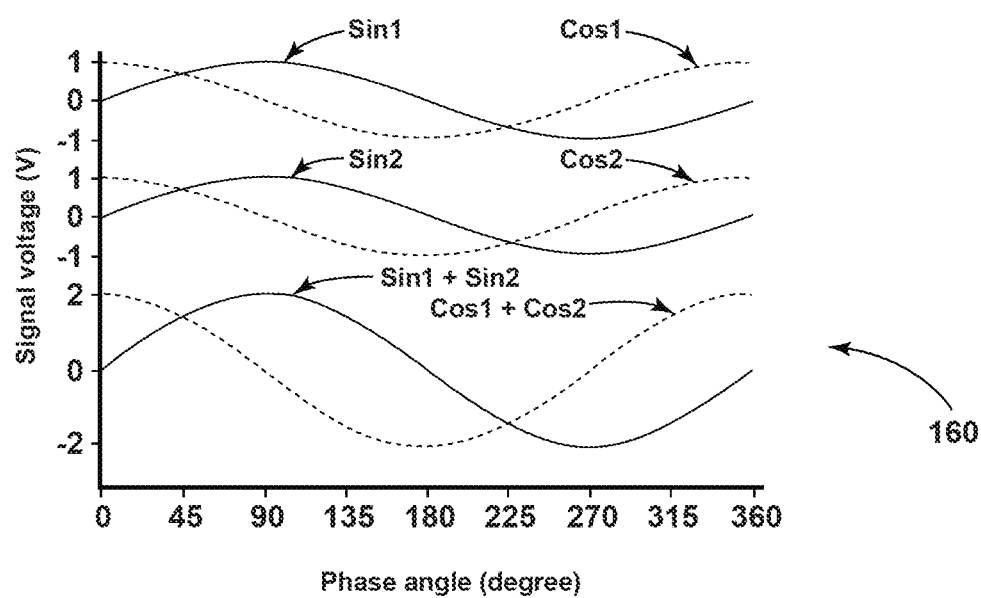
FIG. 6 illustrates three combined graphs for the signals from the magnetic sensor arrays.

The first magnetic sensor array 60 and the second magnetic sensor array 66 sense cosine signals and sine signals that are summed by the summation circuit 110 illustrated in FIG. 5. FIG. 6 shows a graph 160 of the Sine1 signal and Cosine1 signal at a top of the graph in volts versus phase angle. The Sine2 signal and the Cosine2 signal are shown in the middle of the graph 160. The summation of the Sine1 signal plus the Sine2 signal, along with the sum of Cosine1 signal and the Cosine2 signal, are shown at the lowest graph in FIG. 6.

There are various numerical ways to combine the cosine signals and sine signals, such as one or more from a group consisting of: e.g. simple summation before calculating phase angle individually, average of phase angles after calculating phase angle individually, and vector summation for accurate results. The pair of magnetic sensor arrays 60, 66 shown in FIG. 3 are shifted apart by 180 mechanical degrees and can also be considered dual magnetic sensor arrays.

The electronic processor 80 receives the summed cosine and sine values and executes a program or method steps to determine a position and/or rotational speed of the rotatable shaft. The position or speed is provided to a display and/or to a control device via the position/speed output 135 from the electronic processor 80.

Target Wheel Run-Out and Shaft Run-Out

Figure 7:
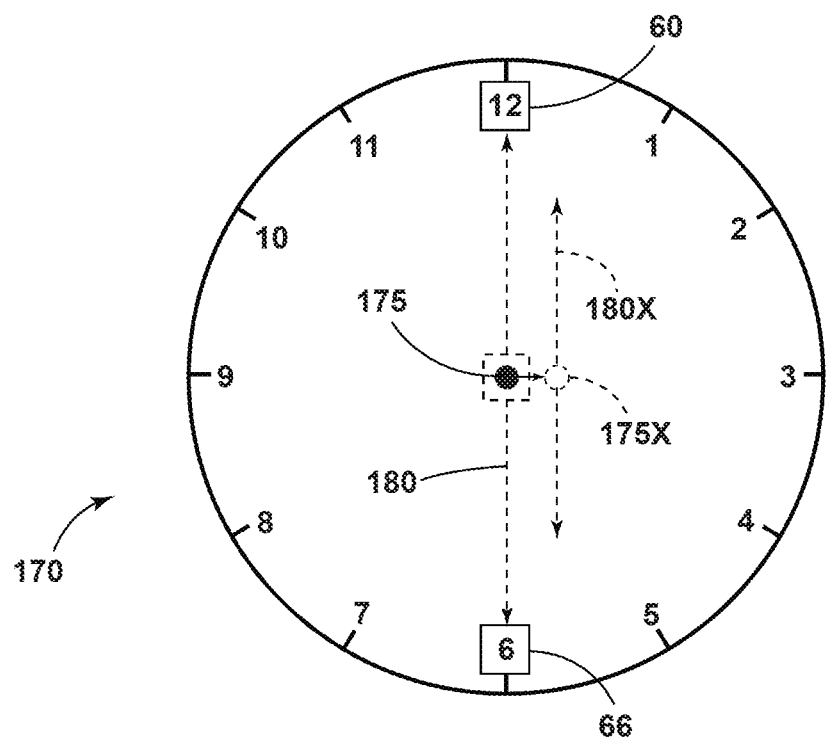
FIG. 7 illustrates a diagram to show target wheel run-out and shaft run-out.

FIG. 7 shows a clock face diagram to explain target wheel run-out and shaft run-out errors. A box containing number "12" represents the first magnetic sensor array 60 and box containing clock number "6" represents the second magnetic sensor array 66. A central axis 175 represents a central axis of a rotatable shaft that is transverse to a broken line 180 shown in FIG. 7 between the magnetic sensor arrays 60, 66. Thus, the central axis 175 of a rotatable shaft is located perfectly between the magnetic sensor arrays 60, 66 in terms of distance and direction.

Target wheel run-out or shaft run-out is caused by various factors including misalignment, vibration or usage/wear. In such an instance, the central axis 175 shifts to location 175X shown in FIG. 7. Thus, as shown by broken line 180X, the central axis and the rotary shaft supporting the target wheel 20 is misaligned. Of course, the multi-polar magnetic ring 36 is not properly in alignment with the magnetic sensor arrays 60, 66. However, the relative position of the target wheel run-out or shaft run-out will balance out due to the locations of the magnetic sensor arrays 60, 66 being at a 180 degree angle. A distance off by one magnetic sensor array 60 is matched by an opposing distance off by the other magnetic sensor array 66.

Figure 8:
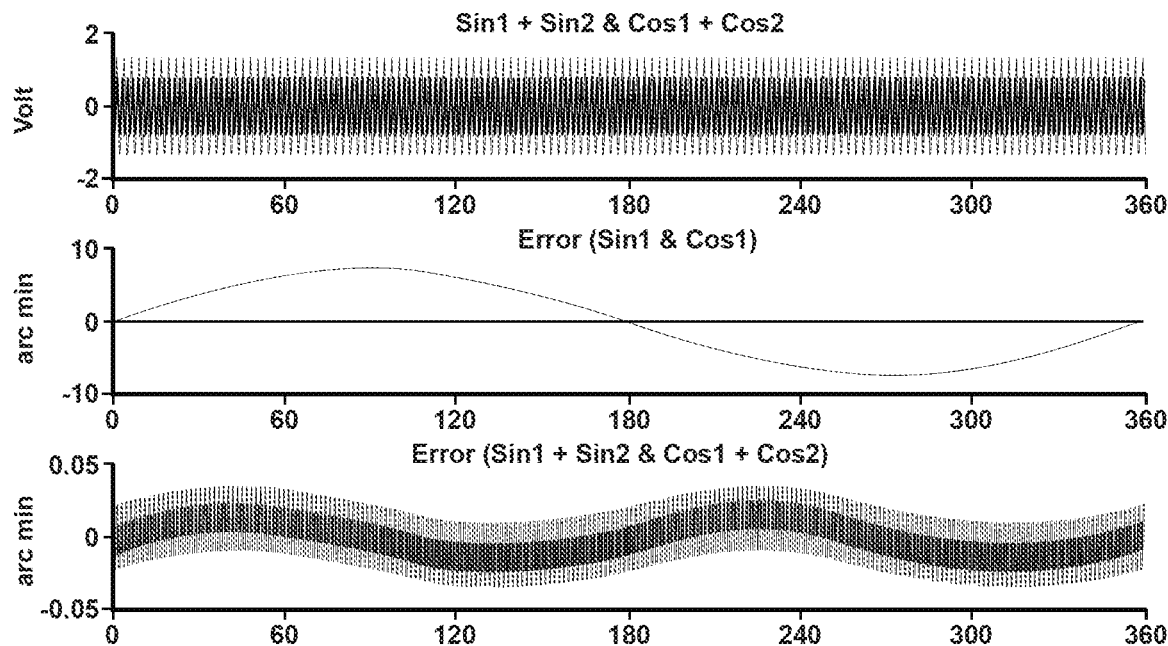
FIG. 8 illustrates three combined graphs for comparison and showing errors.

FIG. 8 shows a graph 190 for comparison of accuracy of a single magnetic sensor array and a pair of magnetic sensor arrays 60, 66 when the target wheel is off-center and not in perfect alignment with the magnetic sensor arrays 60, 66.

The top of the graph 190 of FIG. 8 shows the sum of Sine1+Sine2 signals, and the sum of Cosine1 and Cosine2 signals. The middle graph shows arc minute error for Sine1 and Cosine1 for a single magnetic sensor array. The arc minute scale is −10 to 10 arc minutes for the error of a single magnetic sensor array. The bottom graph shows the arc minute error for (Sine1+Sine2) and (Cosine1+Cosine2). The error scale is from 0.05 arc minute to −0.05 arc minute. Thus, the theoretical improvement is outstanding for the arrangement shown in FIG. 3 having the magnetic sensor arrays 60, 66 disposed at 180 mechanical degrees.

Second Embodiment

A second embodiment that provides a unique non-intuitive configuration to the first embodiment discussed above is to maintain the magnetic sensor arrays 60, 66 at the opposing positions that are 180 degrees offset as shown in FIG. 3, but then one magnetic sensor array 66 is positioned as being rotated without shifting laterally or vertically, 180 degrees about itself in a same location (replace upside from view of FIG. 3) so that the second magnetic sensor array 66 is positioned as being rotated 180 degrees or reversed in a same location. As a result of the reversed orientation, a sine signal path of the second magnetic sensor array provides a cosine signal and a cosine signal path of the second magnetic sensor array provides a sine signal. Then, the sine signal from one of the magnetic sensor arrays 60, 66 can be added or summed to the cosine signal of the other magnetic sensor array, and the cosine signal from the one magnetic sensor array is added to or summed with the sine signal of the other magnetic sensor array. By using the opposite signal paths in the second magnetic sensor array, a benefit of a reduction of systemic errors in the magnetic sensor arrays 60, 66 is gained, as well as having a better balance of delays, non-linearities and impedance characteristic of the final summed signals from the Sine signals and Cosine signals. This arrangement is provided for an even number of magnetic pole pairs or North/South pole pairs.

For an arrangement that includes an odd number of magnetic pole pairs or North/South pole pairs, the orientation of the second sensor array 66 does not need to be rotated to have the same switched sine signals and cosine signals as set forth above.

Third Embodiment

Another unique not-intuitive modification to the configuration above would be to shift the magnetic sensor arrays 60, 66, both 180 degrees mechanical and 90 degrees electrical. The result would be the Sine signal path in the second magnetic sensor array 66 producing a Cosine signal and the Cosine signal path producing an inverted Sine signal. This technique is particularly suited to the differential signals as those produced by the Timken MPS160 and MPS512 sensor arrays. The two differential sine signals from the two magnetic sensor arrays 60, 66 are summed to produce an improved Sine signal. The Cosine signal from one magnetic sensor array 60 would be summed with the inverted Cosine from the other magnetic sensor array 66 by substituting the Cosine + with the Cosine − and Cosine − with the Cosine + from one of the magnetic sensor arrays. This combining of the signals can reduce the summation of systemic errors in the magnetic sensor arrays 60, 66, as well as provide a better balance of delays, non-linearities and impedance characteristic of the final summed signals from the Sine and Cosine sources. The two techniques in the second and third embodiments above, can also be combined. In the event of an even number of pole-pair magnets, the second sensor array 66 can be further shifted 90 degrees electrical.

Figure 9:
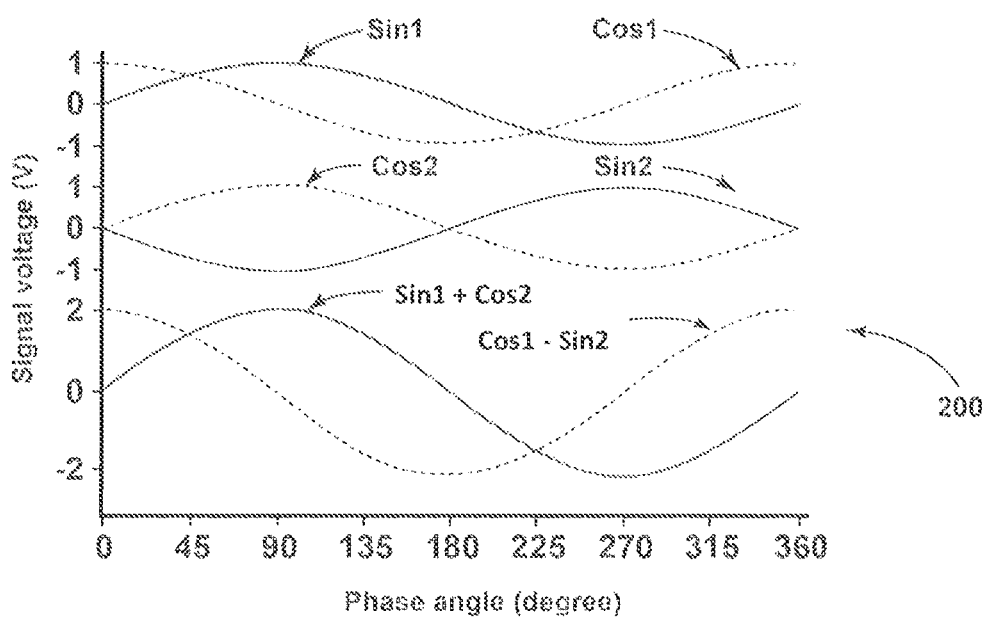
FIG. 9 illustrates three combined graphs for the signals from the magnetic sensor arrays.

FIG. 9 is an example of signal summation of the magnetic sensor arrays 60, 66 separated by 180 mechanical degrees + or − 90 electrical degrees. FIG. 9 shows how the first magnetic sensor array 60 and the second magnetic sensor array 66 sense cosine signals and sine signals, which are summed by the summation circuit 110 illustrated in FIG. 5. FIG. 9 shows a graph of the Sine1 signal and the Cosine1 signal at a top of the graph in volts versus phase angle. The Sine2 signal and the Cosine2 signal are shown in the middle of the graph 160. The summation of the Sine1 signal plus the Cosine2 signal, along with the sum of Cosine1 signal minus the Sine2 signal, are shown at the lowest graph in FIG. 9.

The above disclose arrangements also apply to more than two magnetic sensor arrays 60, 66. For instance, a three-sensor design can also reduce error that is caused by triangular shape of magnets.

Two Pairs of Magnetic Sensor Arrays Embodiment

Figure 10:
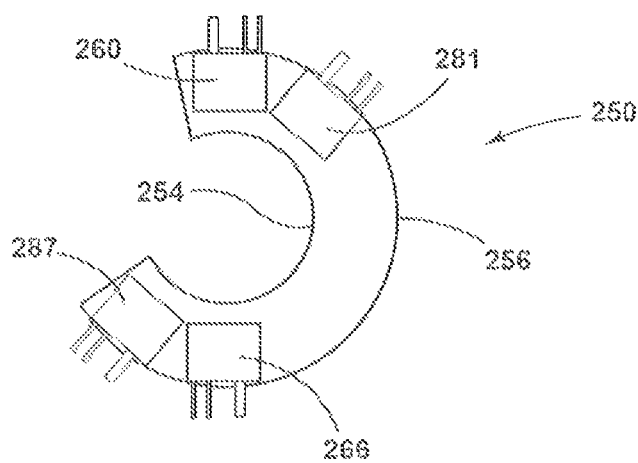
FIG. 10 shows a top view of another sensor assembly having four magnetic sensor arrays.

A further improvement to the position and speed determining system 100 is achieved by using four magnetic sensor arrays in a unique spatial configuration as shown in FIG. 10. FIG. 10 illustrates a top view of a magnetic position sensor assembly 250. The magnetic position sensor assembly 250 includes an inner edge 254 for fixed alignment near a rotatable shaft and the target wheel 20. The magnetic position sensor assembly 250 includes an outer edge 256 and defines a generally horse-shoe shaped, or "C" shaped, annular body.

The magnetic position sensor assembly 250 includes a first magnetic sensor array 260 and a second magnetic sensor array 266 defining a first magnetic sensor array pair.

Both of the magnetic sensor arrays 260, 266 sense the pole pairs of the target wheel 20 to provide a cosine signal and a sine signal. The second magnetic sensor array 266 is disposed transverse to the first magnetic sensor array 260 or at an angle of 180 mechanical degrees. Thus, the magnetic sensor arrays 260, 266 are disposed equidistant about and from a central axis of a rotatable shaft and a line drawn between the magnetic sensor arrays 260, 266 is intended to intersect a central axis of a rotatable shaft. The magnetic sensor arrays 260, 266 each can include a string of sensing elements such as Hall effect sensors.

The magnetic position sensor assembly 250 shown in FIG. 10, includes a third magnetic sensor array 281 and a fourth magnetic sensor array 287 defining a second magnetic sensor array pair. Both of the magnetic sensor arrays 281, 287 sense the pole pairs of the target wheel 20 to provide a cosine signal and a sine signal. FIG. 10 shows that the fourth magnetic sensor array 287 is disposed transverse to the third magnetic sensor array 281 or at an angle of 180 mechanical degrees with respect to the third magnetic sensor array.

The third and fourth magnetic sensor arrays 281, 287 are disposed adjacent the first magnetic sensor array 260 and the second magnetic sensor array 266, respectively. The close proximity results in the "C" shaped sensor shown in FIG. 10 that offers advantages for mounting and servicing. The sine and cosine signals of at least the third and fourth sensor arrays are provided to an additional summation circuit or provided to the summation circuit 110 for summing with the cosine signals and sine signals from the first magnetic sensor array pair defined by the first and second magnetic sensor arrays 260, 266.

The additional third and fourth magnetic sensor arrays 281, 287 serve to improve the overall performance of the position/speed determining system 100 by increasing the signal to noise ratio of the sine and cosine signals, as each magnetic sensor array 260, 266, 281, 287 adds to the total signal, but not to the total signal noise. The magnetic sensor arrays 260, 266, 281, 287 also serve to average the signal from the multi-pole magnet target wheel 20. This special averaging produces a more accurate and constant signal as an error in the position of the magnetic pole on the target wheel is averaged by producing overall Sine and Cosine signals that have reduced error and a more precise angular position. At least one more additional magnetic sensor array pair is contemplated to reduce error. Further, additional pairs of magnetic sensors are provided to sense a second track and obtain and absolute position for the shaft in some embodiments.

One of skill in the art will understand that with any of the disclosed embodiments having a single circular track, additional tracks can be selected having relative positions as desired such that any of the tracks can be disposed as an outside track, inside track, or a middle track. Corresponding additional magnetic sensor arrays are contemplated for sensing the additional tracks. In some embodiments, the absolute position of a shaft is detected and gray code segments are provided as magnets. In other embodiments, the position is calibrated.

Various features and advantages of the invention are set forth in the following claims.

What is claimed is:

1. A system for determining a position and/or speed of a rotatable shaft of a device, the system comprising:
    a target wheel for securement to a rotatable shaft, the target wheel including a plurality of North/South pole pairs;
    a sensor assembly including:
        a first magnetic sensor array for sensing the pole pairs to provide a cosine signal and a sine signal;
        a second magnetic sensor array for sensing the pole pairs to provide a cosine signal and a sine signal, wherein the second magnetic sensor array is disposed transverse to the first magnetic sensor array, and the second magnetic sensor array is disposed at an angle of 180 degrees mechanical and shifted 90 degrees electrical from the first magnetic sensor array;
        a summation circuit configured to sum the sine signal from the first magnetic sensor array and the sine signal from the second magnetic sensor array and to sum the cosine signal from the first magnetic sensor array and the cosine signal from the second magnetic sensor array, and wherein the summation circuit provides the summed sine signals and the summed cosine signals; and
        an electronic processor configured to receive the summed sine signals and the summed cosine signals from the summation circuit, and to determine a position and/or speed of the shaft,
    wherein a sine signal path of the second magnetic sensor array provides a cosine signal and a cosine signal path of the second magnetic sensor array provides an inverted sine signal.

2. The system of claim 1, wherein the summed cosine signals and summed sine signals increase accuracy when the target wheel is offset with respect to a central axis of the rotatable shaft.

3. The system of claim 1, wherein the second magnetic sensor array is aligned across a central axis of the rotatable shaft from the first magnetic sensor array.

4. The system of claim 3, wherein the first magnetic sensor array and the second magnetic sensor array are disposed equidistant from the central axis of the rotatable shaft.

5. The system of claim 1, wherein a sine signal path of the second magnetic sensor array provides a cosine signal and a cosine signal path of the second magnetic sensor array provides a sine signal.

6. The system of claim 1, wherein the target wheel includes a single track of North/South pole pairs.

7. The system of claim 1, wherein combining the cosine signals and sine signals includes one from a group consisting of: simple summation before calculating phase angle individually, averaging of phase angles after calculating phase angle individually, and vector summation.

8. The system of claim 1, wherein each pole of the North/South pole pairs are a same size.

9. The system of claim 1, wherein the target wheel includes a high resolution track of North/South pole pairs and a reference track.

10. The system of claim 1, wherein using opposite signal paths in the second magnetic sensor array results in summing of the cosine signals and summing of the sine signals, and provides a reduction of systemic errors in the first and the second magnetic sensor arrays and a balance of delays, non-linearity and impedance of the summed cosine signals and the summed sine signals.

11. A system for determining a position and/or speed of a rotatable shaft of a device, the system comprising:
    a target wheel for securement to a rotatable shaft, the target wheel including a plurality of North/South pole pairs;

a sensor assembly including:
  a first magnetic sensor array for sensing the pole pairs to provide a cosine signal and a sine signal;
  a second magnetic sensor array for sensing the pole pairs to provide a cosine signal and a sine signal, wherein the second magnetic sensor array is disposed transverse to the first magnetic sensor array, and the second magnetic sensor array is disposed at an angle of 180 degrees mechanical from the first magnetic sensor array;
  a summation circuit configured to sum the sine signal from the first magnetic sensor array and the sine signal from the second magnetic sensor array and to sum the cosine signal from the first magnetic sensor array and the cosine signal from the second magnetic sensor array, and wherein the summation circuit provides the summed sine signals and the summed cosine signals; and
  an electronic processor configured to receive the summed sine signals and the summed cosine signals from the summation circuit, and to determine a position and/or speed of the shaft,
wherein using opposite signal paths in the second magnetic sensor array results in summing of the cosine signals and summing of the sine signals, and provides a reduction of systemic errors in the first and the second magnetic sensor arrays and a balance of delays, non-linearity and impedance of the summed cosine signals and the summed sine signals.

12. The system of claim 11, wherein each pole of the North/South pole pairs are a same size.

13. The system of claim 11, wherein the target wheel includes a high resolution track of North/South pole pairs and a reference track.

14. The system of claim 11, wherein the target wheel includes a single track of North/South pole pairs.

15. A system for determining a position and/or speed of a rotatable shaft of a device, the system comprising:
  a target wheel for securement to a rotatable shaft, the target wheel including a plurality of North/South pole pairs;
  a sensor assembly including:
    a first magnetic sensor array for sensing the pole pairs to provide a cosine signal and a sine signal;
    a second magnetic sensor array for sensing the pole pairs to provide a cosine signal and a sine signal, wherein the second magnetic sensor array is disposed transverse to the first magnetic sensor array, and the second magnetic sensor array is disposed at an angle of 180 degrees mechanical from the first magnetic sensor array;
    a summation circuit configured to sum the sine signal from the first magnetic sensor array and the sine signal from the second magnetic sensor array and to sum the cosine signal from the first magnetic sensor array and the cosine signal from the second magnetic sensor array, and wherein the summation circuit provides the summed sine signals and the summed cosine signals; and
    an electronic processor configured to receive the summed sine signals and the summed cosine signals from the summation circuit, and to determine a position and/or speed of the shaft,
  wherein the target wheel includes a high resolution track of North/South pole pairs and a reference track, wherein the system determines an absolute position of the shaft.

16. The system of claim 15, wherein the first magnetic sensor array and the second magnetic sensor array define a first magnetic sensor array pair for sensing the high resolution track, and the sensor assembly includes at least one additional magnetic sensor array pair disposed for sensing the high resolution track.

17. The system of claim 15, wherein each pole of the North/South pole pairs are a same size.

18. A system for determining a position and/or speed of a rotatable shaft of a device, the system comprising:
  a target wheel for securement to a rotatable shaft, the target wheel including a plurality of North/South pole pairs; and
  a sensor assembly including:
    a first magnetic sensor array for sensing the pole pairs to provide a cosine signal and a sine signal;
    a second magnetic sensor array for sensing the pole pairs to provide a cosine signal and a sine signal, wherein the second magnetic sensor array is disposed transverse to the first magnetic sensor array; and
    an electronic processor configured to receive inputs from the first magnetic sensor array and the second magnetic sensor array, and to determine a position and/or speed of the shaft,
  wherein the first magnetic sensor array and the second magnetic sensor array define a first magnetic sensor array pair, and the sensor assembly includes a third magnetic sensor array for sensing the pole pairs to provide a cosine signal and a sine signal, and a fourth magnetic sensor array for sensing the pole pairs to provide a cosine signal and a sine signal, wherein the fourth magnetic sensor array is disposed transverse to the third magnetic sensor array, and wherein the third magnetic sensor array and the fourth magnetic sensor array define at least a second magnetic sensor array pair to increase accuracy of the position and/or the speed determined for the shaft.

19. The system of claim 18, wherein the electronic processor is configured to receive inputs from at least the first magnetic sensor array pair and the second magnetic sensor array pair, to determine the position and/or the speed of the shaft.

20. The system of claim 18, wherein each pole of the North/South pole pairs are a same size.

* * * * *